July 19, 1966 W. C. GEIGER, JR 3,261,609
PICKUP ARM ASSEMBLY
Filed Feb. 15, 1965 2 Sheets-Sheet 1
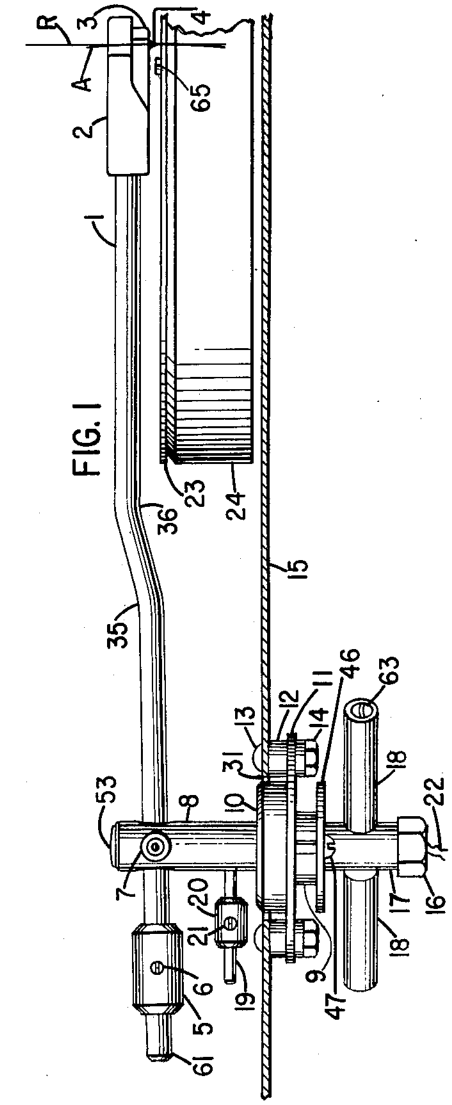
FIG. 1
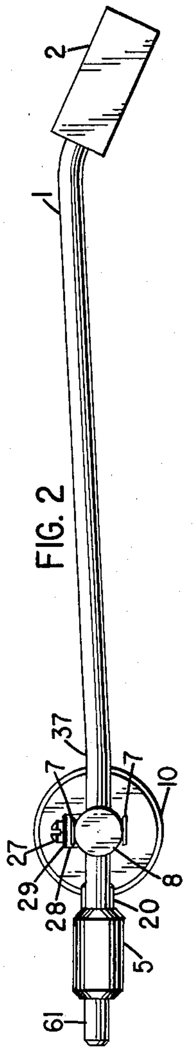
FIG. 2
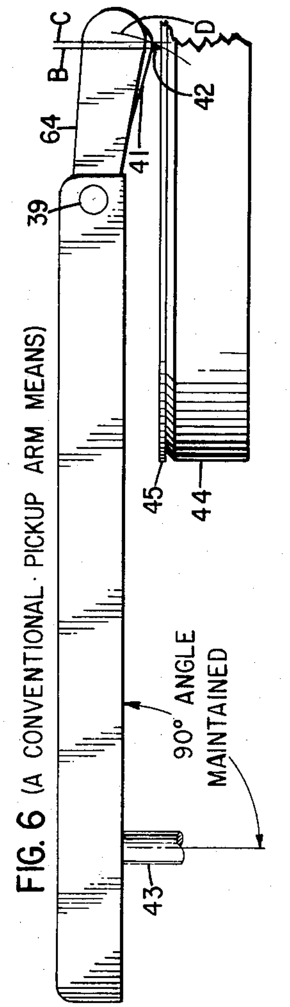
FIG. 6 (A CONVENTIONAL · PICKUP ARM MEANS)
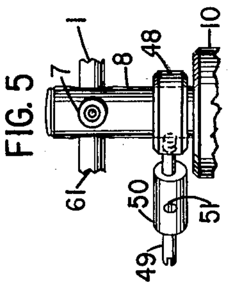
FIG. 5
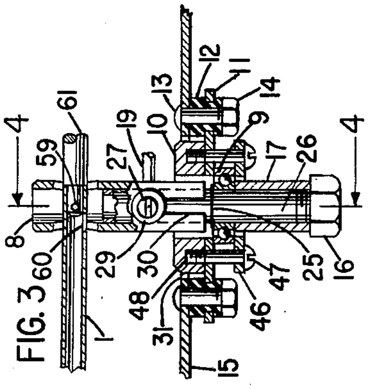
FIG. 3
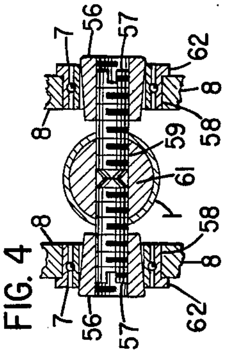
FIG. 4
INVENTOR.
William C. Geiger Jr.
BY Peck & Peck
Attorneys July 19, 1966 W. C. GEIGER, JR 3,261,609

PICKUP ARM ASSEMBLY

Filed Feb. 15, 1965 2 Sheets-Sheet 2

INVENTOR.
William C. Geiger Jr.

BY Peck & Peck
Attorneys 3,261,609

PICKUP ARM ASSEMBLY

William C. Geiger, Jr., 6406 N. 5th St., Philadelphia 26, Pa.

Filed Feb. 15, 1965, Ser. No. 437,617

28 Claims. (Cl. 274—23)

This invention relates to improvements in Pickup Arm Assemblies, which are referred to hereinafter, in the specification, as pickup arm means, which are used for supporting sound pickups, for playing disk phonograph records, while said records are being rotated on rotary turntables, the present application being a continuation-in-part application of now abandoned application Serial Number 123,275, filed July 11, 1961. This invention is particularly directed to a number of various, related, novel improvements in the performance of a pickup arm means which is used for supporting modern sound pickups, which improvements in the performance of this pickup arm means do not in turn create another deficiency in the performance of this pickup arm means. In contrast to this, heretofore, it has been known for an improvement in the performance of a pickup arm means to itself very objectionably impose an unavoidable deficiency along with it, as will be explained in detail hereinafter. Further, this pickup arm means is very advantageous over prior pickup arm means in that it requires no springs whatsoever, and, while providing novel results in performing properly under a number of adverse conditions, to be set forth in detail hereinafter.

*Drawbacks generally inherent in prior pickup arm means.*

In the usual pickup arm means as heretofore constructed, whether springs, or purely weight, were used as the medium for controlling its downward, vertical stylus tracking force on the record groove, said downward, vertical stylus force was very undesirably changed appreciably in value whenever the stylus of the usual pickup arm means was elevated vertically above the playing surface of a record on its turntable. Consequently, said downward, vertical stylus tracking force was varied appreciably with very undesirable results when using the usual pickup arm means as heretofore constructed, when the usual pickup arm means was performing under certain record playing conditions which are not considered ideal, but which conditions sometimes must be coped with: for example, whenever warped records were being played, because of the up and down movement of the stylus which was caused by the warped records, the value of downward, vertical stylus tracking force on the record groove obviously was very undesirably constantly being varied; and, also, whenever a number of records were placed on a turntable one by one, such as in automatic record-changing, when using the usual pickup arm means there then was a very undesirable, appreciable difference between the value of the downward, vertical stylus tracking force placed on the first record positioned on the turntable while it was being played, and the value of the downward, vertical stylus tracking force placed on the last record positioned on the turntable while it was being played. (In view of the rated modern downward, vertical stylus tracking forces of certain modern sound pickups being as low as one gram, and even less, on the record groove, a change of only ¼ of a gram in the value of the downward, vertical stylus tracking force on the record groove becomes an appreciable amount for such sound pickups.)

Moreover, it has been recognized by many persons associated with the record player industry, and is, of course, a physical fact, that a pickup arm means which requires the use of one or more springs (as do a great many of the modern pickup arm means presently being used) in the controlling of its downward, vertical stylus force on the record groove imposes appreciable variations, developing over a period of time, in its value of the downward, vertical stylus force which it places on a record groove. This is because spring force values of all springs themselves normally are inherently appreciably affected by the permanent stretch or the permanent compression (commonly referred to as permanent set) which springs themselves normally, inherently take at various times while being used. Consequently, those pickup arm means, using springs in the control of the downward, vertical stylus tracking force they place on the record groove, objectionably require periodic rechecking of said downward stylus force and readjusting of their spring to compensate for these normal, inevitable, highly undesirable variations, occurring over a period of time, in the value of said downward stylus tracking force they place on the record groove.

Thus, for the foregoing reasons, the danger is always present that, due to the "permanent set" inherent in springs themselves at various times while being used, the user of the spring-type pickup arm means as heretofore constructed, may, unknowingly, at various times be inflicting too much, or obtaining too little, downward force by his stylus on the record groove; and the danger is also always present that the user of either the spring-type, or the purely weight type, usual pickup arm means as heretofore constructed, due to the elevated position the stylus is placed in under the certain aforesaid record playing conditions which are not considered ideal but which conditions sometimes must be coped with such as playing warped records or automatic record-changing, may also be inflicting too much, or obtaining too little, downward force by his stylus on the record groove.

In connection with the above, it is well established in the record player industry, and is an obvious fact: that too large a value of downward, vertical stylus tracking force on the record groove (more than that at which the stylus compliance of the sound pickup enables proper tracking of a record groove by its stylus) causes excessive record surface noise in the reproduced sound and excessive, damaging wear on both the stylus and the delicate sound-engravings on the record groove; and that with too small a value of downward, vertical stylus tracking force on the record groove (less than that at which the stylus compliance of the sound pickup enables proper tracking of a record groove by its stylus) the stylus can successively and rapidly break and make contact with the sound-engravings on the record groove and thus cause numerous clicks and resultant severe distortion in the reproduced sound, as well as possible damage to the sound-engravings on the record groove; and of course the possibility of groove-jumping by the stylus likewise exists.

Hence, maintaining constant, at all times, and under all record playing conditions, the correct value of downward, vertical stylus tracking force on the record groove which has been preselected for the sound pickup which is being used on a pickup arm means is an exceedingly important requisite for, at all times, and under all record playing conditions, maintaining high fidelity performance, a minimum of damaging wear on the stylus, and a minimum of damage and/or damaging wear of sound-engravings on the record groove.

*General objects of this invention*

Accordingly, an object of this invention is to overcome all these aforementioned drawbacks of the usual pickup arm means as heretofore constructed, by providing a pickup arm means which provides a permanent (once it has been adjusted) value of downward, vertical stylus tracking force on the record groove; and which value of downward stylus force is, also, maintained constant at any preselected value even when measured at any distance above the top surface of a turntable means up to a distance of at least two and one half inches above the top surface of a turntable; to thus provide a pickup arm means which can permanently, provide the proper preselected value of downward, vertical stylus tracking force on warped records, as well as on any of all the records, warped or otherwise, which are played on an automatic record-changer.

Another object of this invention is to provide substantially perfect lateral balance of a pickup arm means wherein all practical amounts of unleveling of an entire record player assembly, even up to 15 degrees of unleveling and beyond, can not cause lateral imbalance to the pickup arm means, and wherein this is the fact even though the pickup arm means is devoid of springs, regardless of the weight of the modern sound pickup being used, and also regardless of the value of the proper preselected value of downward, vertical stylus tracking force which is placed on the record groove, even for values of less than one gram.

Still other objects and novel results of this invention and the manner in which these results have been achieved will be evident from, and set forth more fully in, the following specification and claims, considered in connection with the attached drawings to which they relate.

*Description of drawings*

FIG. 1 is a side elevational view of the pickup arm means embodying this invention, showing the following: an adjustable counterweight means for obtaining a preselected, downward, vertical stylus tracking force for various preselected sound pickup means having various respective weights; another adjustable counterweight means for providing balancing of the pickup arm means relative to its pivot for its lateral movement, by means of a single, longitudinal adjustment; and a balanced mass means for providing a larger lateral than vertical inertia of the pickup arm means.

FIG. 2 is a plan view of the pickup arm means which is disposed above the mounting plate 15, showing primarily the mass distribution of the pickup arm itself, laterally.

FIG. 3 is a partially sectioned, detailed view, with parts of the device broken away, and with mass 18 and audio wires 22 removed, showing primarily the pivot means which supports the pickup arm means for lateral movement, and the adjustment means for raising and lowering the pivot which supports the pickup arm for vertical movement.

FIG. 4 is an enlarged, sectioned, detailed view of the pivot means which supports the pickup arm for vertical movement, which includes the ball-type bearing arrangement, and is taken along the lines 4—4 of FIG. 3, parts of the device being broken away.

FIG. 5 is a view in elevation of another embodiment of the balancing means for providing balancing of the pickup arm means relative to its pivot for its lateral movement, which balancing means requires both an angular and a longitudinal adjustment, parts of the device being broken away.

FIG. 6 illustrates a conventional pickup arm means and is a side elevation view of a modern, conventional, pickup arm means, and is shown in order to illustrate how a modern, conventional, pickup arm means, which provides a greater lateral than vertical inertial, objectionably introduces wow and tracking distortion into the reproduced sound during the playing of wraped records, and if used in the customary automatic record-changer would introduce tracking distortion, as will be explained in detail hereinafter.

Figure 7:
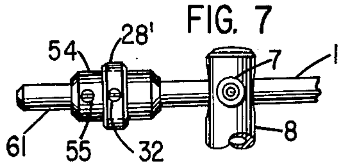
FIG. 7 is an elevational view of another embodiment of the pickup arm means, with parts thereof broken away, showing an additional adjustment means in the form of a fine adjustment means for adjustment of the downward, vertical stylus tracking force without imposing an increase in the pickup arm inertia over what it would be if the adjustment means were omitted.

*Details of construction of the pickup arm means embodying this invention*

Referring more specifically to the drawings, and especially to FIG. 1 thereof, pickup arm 1 supports a sound pickup support 2, which sound pickup support 2 is preferably made of wood or a very light-weight metal. Said pickup arm 1 is also made extremely light in weight, preferably a very thin-walled tubing of a very light-weight metal, such as aluminum. It is to be understood that the pickup arm 1 may also be made still lighter in weight by being constructed of wood. Sound pickup support 2 is for providing support for any modern conventional sound pickup 3, including the cartridge type, and high rated stylus compliance low rated stylus tracking force sound pickups, having a stylus 4. The pickup arm 1 is supported for up and down movement by a pivot journaled in the bearing 7.

The complete pivot means which supports the pickup arm 1 for vertical movement is shown in detail in FIG. 4, which pivot means, referring to FIG. 4, comprises the following. Two ball-type bearings 7, miniature in size, are respectively inserted in, and provide a precise fit with, clearance holes 58 in the tube 8. Two set-screws 57 are attached and tightened to threaded portion 59 of the pickup arm 1 and 61 from opposite sides thereof in the manner shown. The tubular portion 1 of the pickup arm, which, as shown in FIG. 3, contains the hole 60 for the audio wires 22 which are shown in FIG. 1, thus is rigidly attached to the solid circular shaft portion 61 of the pickup arm, which solid shaft portion 61 of the pickup arm is inserted in the tubular portion 1 of the pickup are in the manner which is shown in FIG. 3, the thread 59 being added after said insertion of the solid shaft portion 61 into the tubular portion 1. Further referring to FIG. 4, the two cones 56 which are threaded along their axes in concentric relation to their tapered external circumferential surfaces, are respectively rotated inwardly toward the pickup arm 1 on the threads of the respective screws 57, until their cone surfaces press against the inside circumference of the inner race of the respective miniature ball-bearings 7 with just sufficient force to hold the flanges 62 of the ball-bearings 7 securely to the tube 8. Cones 56 thereby also take up on play between balls and races of the bearing 7 and thus enable obtaining a very precise overall fit, without preloading the bearings 7, for the pivoting of this pickup arm means for vertical movement. It is to be understood that there should be no excess force added to the ball-type bearings 7 by the cones 56 which would thereby preload the ball-type bearings 7 and in turn increase the frictional forces thereof. A liquid sealant should then be placed between each of the screws 57 and their respective cones 56 to lock the cones 56 in their said proper positions. The use of ball-type bearings in the pivoting of this pickup arm means for vertical movement which pickup arm means is devoid of springs, enables, for reasons to be explained hereinafter, the same downward, vertical stylus tracking force to be obtained whether the pickup arm is being raised or lowered relative to the top surface of the turntable when measured by a lift-type weight scale which result is very advantageous when playing warped records.

Referring to FIG. 1, both the counterbalancing of the weight of the preselected sound pickup 3 which has been installed on the sound pickup support 2 and the preselecting of the downward, vertical stylus tracking force of the stylus 4 on the record 23 is controlled solely by the counterweight 5, by sliding the counterweight 5 longitudinally on the solid circular shaft 61 (which shaft 61, as explained above, is rigidly formed to the pickup arm 1 and thereby is actually is an extended portion thereof) to the required position for obtaining the preselected, downward stylus tracking force. The counterweight 5 is then locked in said required position by means of the set screw 6. Thus, in this invention, controlling of the downward, vertical stylus tracking force on the record 23 which is supported on the turntable 24, is accomplished entirely by means of highly stable mass, and requires the use of no springs whatsoever.

The turntable 24 shown in FIG. 1, is rotated by suitable drive means and is also supported by suitable means on the mounting plate 15, which means are not a part of this invention and therefore are not shown.

Referring to FIG. 3, the pivot at 59 for supporting the pickup arm 1 for vertical movement, is in turn supported by the vertical tube 8 which in turn is supported through attachment to a vertical inner tube 26, as will be explained, for rotational movement of the ball-type pivot bearing 9 thus permitting lateral movement of the pickup arm 1. The manner in which the vertical tube 8 is supported for rotational movement by the bearing 9 is best understood by referring to FIG. 3. The vertical outer tube 8 is slipped over the inner tube 26, which inner tube 26 is provided with a threaded lower end, and the vertical outer tube 8 is attached to the inner tube 26 by the screw 27 and the locking washer 29, these parts for attaching the outer tube 8 to the inner tube 26 being further clearly shown in FIG. 2 wherein the bushing 28 is also shown. Further referring to FIG. 3, by virtue of the slot 30 on the outer tube 8, the outer tube 8, and with it the pivot located at 59 for vertical movement of the pickup arm 1, may be raised and lowered relative to the inner tube 26, the outer tube 8 being locked to the inner tube 26 in a preselected position of elevation by the screw 27. Accordingly, referring to FIG. 1, said pivot for vertical movement of the pickup arm 1, which pivot is journaled in the bearing 7 shown in FIG. 1, can be located in highly desirable preselected positions of elevation relative to the upper surface of the turntable 24, which will be discussed in detail hereinafter. Again referring to FIG. 3, it is to be understood that the slot 30 is so formed that it provides clearance between the circumferential surface of the shank of the screw 27 and all the edges of the slot 30. The inner tube 26 to which the outer tube 8 is thus affixed is, in turn, attached to the inner race of the ball-type bearing 9 which bearing supports the pickup arm means for lateral movement, in the following manner. A retaining ring 25 which is fixed to the inner tube 26, rests on the top surface of the inner bearing race of the bearing 9. A nut 16 is provided which is threaded on the lower end of the inner tube 26, and upon being drawn up tightly against the lower end of the tube 17, which tube 17 by making contact at its upper end with the underneath surface of the inner bearing race of the bearing 9, thereby securely affixes the inner tube 26 to the inner race of the bearing 9. Thus, the inner race of the bearing 9 is clamped between the retaining ring 25 and the upper end of the tube 17, and in turn the inner tube 26 is securely affixed to the inner race of the bearing 9. Said affixing of the inner tube 26 to the inner race of the bearing 9 is thus accomplished without customary expensive precision fits between the inside diameter of the inner race of the bearing 9 and the outside diameter of the tube 26 which goes therethrough.

Further referring to FIG. 3, the outer race of the pivot bearing 9 is supported by a clamping assembly which in turn is supported from the mounting plate 15 by a plate 11. The plate 11 is mounted to depend from mounting plate 15 by means of screws 13 and nuts 14. Conventional rubber mounts 12 extend along the shanks of screws 13 between plates 11 and 15 and nuts 14. A collar 10 is provided which rests on plate 11, the collar 10 being formed with threaded holes or sockets 48 therein and positioned relative to plate 11 so that said holes 48 are in registry with holes which are formed in plate 11 as shown in FIG. 3. A plate 46 is also included in the assembly and engages the underside of the outer race of the pivot bearing 9. With collar 10 and plates 11 and 46 positioned as shown in FIG. 3, they are maintained in such positions by means of two screws 47 which pass through two holes in plate 46 and also through two holes in plate 11 and into threaded sockets 48 in collar 10. Upon tightening of screws 47, the outer race of bearing 9 is clamped between plate 11 and plate 46 to thereby support the outer race of the lateral pivot bearing. Here again, extremely precise fits, this time for securely holding the outer diameter of the outer race of the bearing 9, are not required. Furthermore, it is intended that in this pickup arm means, a double-row, ball-type bearing, or two single-row ball-type bearings mounted in a conventional "duplex" arrangement, may be readily substituted for the single-row, ball-type bearing 9 which is shown, for in turn obtaining increased stability of the outer vertical tube 8.

As shown in FIGS. 1 and 3, the plate 11, and thus the entire pickup arm means is supported by means of the screws 13 and the nuts 14 to the mounting plate 15, the plate 11 and the entire pickup arm means being isolated from any vibration which may be present in the mounting plate 15 by the conventional rubber mounts 12. Attention is here directed to the fact that the hole 31 in the mounting plate 15 provides ample clearance for the collar 10 to insure the maintaining of said isolation of the pickup arm means from the mounting plate 15.

Further, referring to FIG. 1, a pair of inertial weights 18 are attached in balanced relation to the tube 17, to extend radially therefrom, in opposite directions, by means of screws 63 (which tube 17 is further shown in FIG. 3). These inertial weights 18 enable the vertical inertia of the pickup arm 1 and 61 and including the vertical inertia of the sound pickup support 2 and the vertical inertia of the counterweight 5 to be made to a highly desirable extremely small value while retaining at least substantially the same horizontal distance from the pivot which is journaled in the bearings 7 to stylus 4 as from the pivot which is journaled in the bearing 9 to stylus 4 for obtaining minimum wow in the reproduced sound due to the pickup arm, as will be explained in detail hereinafter.

Referring to FIG. 1, the horizontal shaft 19 extends horizontally from, and is affixed to, the outer tube 8. The mass 20 is longitudinally slideable on the horizontal shaft 19 and is affixed thereto in longitudinally adjusted position by means of the set-screw 21, and is in the same vertical plane as the upper counterbalance weight 5. By solely a longitudinal adjustment of the mass 20 by sliding the mass 20 along the horizontal shaft 19 and then affixing it in adjusted position thereto, the mass 20 is utilized solely for the purpose of providing balance of the mass of the entire laterally movable portion of the pickup arm means relative to its axis of rotation of its pivot for its lateral movement, which pivot is journaled in the bearing 9, for the respective sound pickup being used and the preselected, downward, vertical stylus tracking force of the preselected sound pickup, after such stylus tracking force has been preselected solely by the use of the counterweight 5. The advantages afforded by the mass 20 when used in combination with the pickup arm means will be set forth in detail hereinafter.

The cover 53 shown in FIG. 1, atop the vertical tube 8 is for improving appearance and for keeping the inside of the vertical tube 8 clean. The wires 22 shown in FIG. 1, are audio wires connecting to the sound pickup 3. As is readily apparent from FIG. 3, these audio wires 22 are readily passed through the inside of the vertical tube 26 into the inside of the vertical tube 8, then through the hole 60 in the tubular portion 1 of the pickup arm, and then on through the inside of the tubular portion 1 of the pickup arm to the sound pickup 3.

*Preselected, downward, vertical stylus tracking force of the pickup arm means maintained constant within a variation of 0.1 of a gram when measured while the stylus is at any distance above the turntable up to a distance of at least 2½ inches; and while pivot for vertical movement of pickup arm may, also, be positioned for minimizing tracking distortion in automatic record-changing and in playing warped records and for practically obviating wow in the reproduced sound which is due to the pickup arm means during the playing of warped records.*

This pickup arm means shown in all forms of the invention is capable of, and is therefore directed to, providing novel results, and without imposing loss of certain other important highly desirable features which have been known and sometimes used in pickup arm means for many years. For example, referring to FIG. 3, and as hereinbefore described in detail, the outer tube 8 of the pickup arm means is so arranged that the pivot at 59 for vertical movement of the pickup arm 1, can be readily located at various elevation points, by affixing the outer tube 8 to the inner tube 26 at various elevations, by means of the convenient screw 27. Thus, referring to FIG. 1, the axis of rotation of said pivot which is journaled by bearing 7 of FIG. 1, can be located either on a horizontal line with the top surface, or very slightly above the top surface, of a record 23 for playing records singly as shown by FIG. 1; or, for an automatic record-changer, the axis of rotation of said pivot journaled in bearing 7 for vertical movement of the pickup arm 1, can be aligned horizontally with the mid-point of the vertical depth of a full stack of records placed on the turntable. The arc A has its center on the axis of rotation of the pivot journaled in the bearing 7, and thus the arc A is the vertical path of the stylus 4. Thus the latter said location of the axis of rotation of said pivot journaled in the bearings 7 enables substantially the flattest arc in which the stylus can be raised and lowered when playing a full stack of records, either warped or unwarped, on an automatic record-changer. The former location of the axis of rotation of said pivot journaled in the bearings 7 which location is the location shown in FIG. 1, enables substantially the flattest, and which obviously is an even slightly flatter, arc shown as A in FIG. 1, in which the stylus 4 can be raised and lowered when playing warped records on a record player for playing records singly. Of course, an unwarped record played singly does not raise or lower the stylus. The line R is a straight, vertical, reference line to illustrate the flatness and verticalness of the vertical path A of the stylus 4 of the pickup arm 1. Moreover, a flat, vertical arc A for the path of the stylus, in playing warped records singly, or in playing any record of a conventional stack of records on the turnable on an automatic record-changer, including warped records also, maintains the stylus 4 location, relative to the turntable center pin 65, extremely close to its optimum, preselected, location of tangency relative to the record groove, for thus maintaining, at all times under said record playing conditions, minimum tracking distortion.

Referring to FIG. 6, the arc D has its center on the axis of rotation of the pivot at 39, and thus said arc D is the vertical path of the stylus 42. Consequently, if the pivot for vertical movement of the pickup arm was located as shown at 39 for the arm 64 in FIG. 6, as it is on a number of pickup arms currently in use, then, when warped records are being played, undesirable wows (i.e. a non-recorded variation in the pitch of the reproduced sound) would be undesirably introduced into the reproduced sound, because for each small fraction of a revolution of a record during which the warp occurs, the stylus 42 in being elevated by the warp is, in this case, as shown by its said vertical path D, undesirably moving back and forth from B to C which back and forth movement of the stylus obviously, thus appreciably varies the surface speed of the record groove with relation to the stylus 42 for each said small-fraction of a revolution of the record during which the warp occurs which thus causes said undesirable non-recorded wow.

Moreover, during the playing of warped records with the pickup arm shown in FIG. 6, the stylus 42 by changing its location from its optimum, preselected, location of tangency relative to the record groove which optimum location is shown at B to its new location at C (in actual practice optimum tangency of the stylus to the record groove is established by a predetermined location of the stylus 42 at B relative to the center of the turntable 44), thus destroys the optimum preselected position of tangency of the stylus relative to the record groove and thereby causes unwarranted tracking distortion in the reproduced sound during said movement of the stylus 42 from B to C as well as during the return movement of the stylus 42 from C to B.

Furthermore, if the conventional pickup arm means of FIG. 6 were used in conventional automatic record-changing, the optimum, preselected, location of tangency of the stylus 42 relative to the record groove would of course be changed even more than from B to C, shown in FIG. 6, during the playing of the first to the last record of a stack of records being placed on the turntable, which would thereby further destroy the optimum, preselected, tracking tangency of the stylus relative to the record groove and, in turn, the conventional pickup arm means of FIG. 6 would, continuously, add even more tracking distortion in the reproduced sound during the playing of some of the records stacked on the turntable of an automatic record-changer than it adds in playing warped records singly.

It follows that because, due to aforesaid location of the axis of rotation of the pivot journaled in the bearings 7, there is no appreciable back and forth movement of the stylus of this pickup arm 1 as is shown in FIG. 1, as from B to C in FIG. 6, with relation to the record groove on warped records, the surface speed of the record groove relative to the stylus of the pickup arm shown in FIG. 1 is maintained at its proper value and thus there can be no discernible wow created in the reproduced sound caused by this pickup arm means of FIG. 1 when playing warped records.

Further, because, due to aforesaid location of the axis of rotation of the pivot journaled in the bearings 7, such movement of the stylus of this pickup arm means shown in FIG. 1, as from B to C in FIG. 6, is practically non-existent, as is shown in FIG. 1, the stylus of this pickup arm means of FIG. 1 is thus maintained substantially fixed at its optimum, preselected, position of tangency relative to the record groove during the playing of warped records and in automatic record-changing. Thus, in turn, tracking distortion cannot be created in the reproduced sound by this pickup arm means in FIG. 1 due to such movement of the stylus, as from B to C in FIG. 6, when the playing warped records and in automatic record-changing.

At the same time the above-said highly desirable wow obviating result, and minimizing of tracking distortion, obtained from these aforesaid conditions illustrated by FIG. 1, is being maintained by this pickup arm means because of said manner in which it is constructed; it is pointed out that this pickup arm means is, also, so formed in this invention, by the use of appropriate bends 35 and 36 shown in FIG. 1, that, by means of its adjustable counterweight 5, the weight of the vertically movable portion of this pickup arm means is capable of being adjusted to maintain constant, within a variation of 0.1 of a gram, zero value of downward, vertical stylus tracking force when measured at any distance above the top surface of the turntable up to a distance of at least 2½ inches above the top surface of the turntable. This novel result is accomplished by forming the pickup arm 1 by means of the bends 35 and 36 shown in FIG. 1, so that the total mass of the entire vertically movable portion of the pickup arm means including a preselectable sound pickup means is placed in practically perfect static balance in a vertical plane when suitable adjustment of the counterweight 5 is made. To accomplish this, referring to FIG. 1, the center-line of the total mass of the entire vertically movable portion of the pickup arm means (which total mass includes the mass of the pickup arm 1 and 61, plus the mass of the counterweight 5, plus the mass of the sound pickup support 2, plus the mass of a preselected sound pickup means) is disposed, by use of said appropriate bends 35 and 36, so that it, at all times, actually or is so close that for the desired result it in effect, passes through the axis of rotation of the pivot for vertical movement of the pickup arm, which pivot is journaled in the bearing 7. Further, the center-line of the mass of the various preselected sound pickups themselves which sound pickups may weigh different amounts, and also the center-line of the mass of the counterweight 5 itself, are also so disposed, by means of bends 35 and 36 formed in the pickup arm 1, that, each, is actually, or is so close that for the desired result it in effect, is on said center-line of the total mass of the entire vertically movable portion of the pickup arm means. Thus, the center-line of the mass of the preselected sound pickup itself and also the center-line of the mass of the counterweight 5 itself, each, being on the same center-line as the center-line of the total mass of the entire vertically movable portion of the pickup arm means, likewise, at all times, actually, or is so close that for the desired result it in effect, passes through the axis of rotation of the pivot journaled in the bearings 7.

Accordingly, when the counterweight 5 has been adjusted to obtain said zero value of downward, vertical stylus force when measured at any distance up to a distance of at least 2½ inches above the top surface of the turntable 24, the center-of-gravity of the total mass of the entire vertically movable portion of the pickup arm means actually, or is so close that for the desired result it in effect, coincides with the axis of rotation of the pivot for vertical movement of the pickup arm which pivot is journaled in the bearings 7, and consequently the vertically movable portion of the pickup arm means is then in practically perfect static balance relative to its pivot journaled in the bearings 7. These above-said mass distributions of the vertically movable portion of this pickup arm means shown in FIG. 1 are all accomplished by forming said appropriate bends in the pickup arm 1, as illustrated at 35 and 36 in FIG. 1. The way in which said bends 35 and 36 were actually obtained will be explained hereinafter. The aforesaid at least 2½ inches of constant, within a variation of 0.1 of a gram, downward, vertical stylus force above the top surface of the turntable 24 enabled by this pickup arm means of FIG. 1, when referred to hereinbefore and hereinafter, refers to a total usable distance measured, when the pivot journaled in the bearings 7 has been positioned relative to the turntable 24 for automatic record-changing, in a manner hereinbefore explained. Thus, a more than adequate range of such constant stylus force is available for automatic record-changing, and for playing all records singly.

Consequently it follows, because of said forming of the pickup arm 1, that as the weight distribution of the vertically movable portion of the pickup arm means is changed, solely by sliding the counterweight 5 into a fixed position closer to the pivot journaled in the bearings 7, that this pickup are means is capable of providing a preselected value of downward, vertical stylus force greater than zero which is, also, maintained constant, within a variation of 0.1 of a gram, when measured at any distance above the top surface of the turntable up to a distance of at least 2½ inches above the turntable, since, while the center-of-gravity of the total mass of the entire vertically movable portion of the pickup arm means has then shifted away from the axis of rotation of the pivot journaled in the bearings 7, the center-line of the total mass of the entire vertically movable portion of the pickup arm means still, as it always does, actually, or is so close that for the desired result it in effect, passes through the axis of rotation of the pivot journaled in the bearings 7 for the aforesaid reasons.

Accordingly, various modern, practical, preselected values of downward, vertical stylus force are respectively afforded simply by adjusting the counterweight 5, and the pickup arm means according to this specification is capable of then also providing the respective preselected downward stylus force maintained constant in value within a variation of 0.1 of a gram, when measured at any distance above the top surface of the turntable up to a distance of at least 2½ inches.

Furthermore, because, as has been explained, the center-line of the mass of various, preselected sound pickups themselves which sound pickups may weigh different amounts, and also the center-line of the mass of the counterweight 5 itself, each, at all times, actually, or is so close that for the desired result it in effect, passes through the axis of rotation of the pivot for vertical movement of the pickup arm journaled in the bearings 7, as a result of the bends 35 and 36 formed in the pickup arm 1; the above-stated highly desirable, constant within a variation of 0.1 of a gram, preselected, downward, vertical stylus force which is maintained for a distance of at least 2½ inches above the top surface of the turntable is further obtainable for various, modern sound pickups when respectively used on this pickup arm means of FIG. 1 which sound pickups may possess customary different respective weights. Moreover, the fact that the bearings 7 journalling said pivot for vertical movement of the pickup arm means are ball-type (extremely low friction) bearings as is shown in FIG. 4, enables said downward stylus tracking force to be maintained substantially constant whether the pickup arm is being raised or whether the pickup arm is being lowered when said downward stylus force is measured, which is very advantageous when playing warped records. Accordingly, improved tracking of warped records, and improved tracking of all records played in automatic record-changing, is also obtained for, various, modern sound pickups when respectively used on this pickup arm means of FIG. 1, which sound pickups may possess customary different respective weights.

The actual procedure used in definitely establishing the location and angles of the vertical bends 35 and 36 formed in the pickup arm 1 of FIG. 1, was, first, to visually approximate the vertical bends 35 and 36 in the pickup arm 1 so that by visual inspection the center-line of the mass of the counterweight 5, the center-line of the mass of sound pickup 3, and the center-line of the total mass of the entire vertically movable portion of the pickup arm means, all appeared to be on a common center-line, and said common center-line also visually appeared to pass through the axis of rotation of the pivot journaled in the bearings 7. Then, the downward, vertical stylus tracking force was checked throughout the specified distance above a turntable, and small readjustments, as required, were made in the bends 35 and 36, which bends are shown in FIG. 1, until the various, respective, preselected, downward, vertical stylus tracking forces remained constant within 0.1 of a gram when measured at any point throughout said distance of 2½ inches above the top surface of the turntable, when the equivalent weights of various modern sound pickups having different respective weights were respectively installed on the pickup arm means in a definite preselected location on the aforesaid center-line. Thus, the location and angles of said bends 35 and 36 in the pickup arm 1 were definitely and permanently established.

*Test results of experimental model, in connection with disclosures set forth under last mentioned title*

Solely by adjusting the counterweight 5, the experimental model of the pickup arm means embodying this invention, which pickup arm means is, very desirably, entirely devoid of springs, actually was found to provide a preselected, downward, vertical stylus force which, when measured when the stylus was elevated to any position throughout a distance of 3 inches above the top surface of the turntable, varied within 0.1 of a gram. This result was also provided by the experimental model of the pickup arm means of this invention for all values of downward, vertical stylus force up to and beyond 6 grams, and even when the equivalent weights of modern sound pickups were suspended in the aforesaid proper location on said pickup arm means, which equivalent weights covered a range for 15 well known modern sound pickups varying in weight from 2 grams to 19 grams. A precision beam-balance type weighing scale, which scale is devoid of springs, was used for the above test, said scale being elevated through said range of 3 inches via a scissor type jack. This scale was checked with 1.0 gram, and 0.1 of a gram, precision weights and found to be extremely accurate. Elevation of said weighing scale by the scissor type jack was found to have no substantial effect on readings of the scale, since the platform of said jack remained substantially level during its said elevation.

Moreover, it was found that, by the use of anti-friction ball-type bearings in the experimental model (which bearings are shown in FIG. 4 and are of course miniature in size and are practically friction-free for this relatively low force application) for pivoting for vertical movement of the pickup arm, that the value of downward, vertical stylus force of the sound pickup means of the experimental model is maintained substantially constant, whether the stylus of the pickup arm means is being raised, or whether the stylus of the pickup arm means is being lowered, while said stylus force is being measured, by the aforesaid weighing scale, at any distance above the top surface of the turntable up to a distance of 3 inches. This result obviously is, further, advantageous when playing warped records, in view of the up and down movement they impart to a stylus.

Furthermore, records which were warped, by means of a heat lamp, with warps much greater than would ever normally occur in actual practice were played with no discernible wow in the reproduced sound whatsoever.

It is, also, inherent in this pickup arm means that preselected values of downward stylus tracking force, when measured at the stylus measure the same, within .05 of one gram, at all elevation points from zero to one inch above the top surface of the rotary turntable means.

*Very small vertical inertia of pickup arm means, which vertical inertia is much smaller than lateral inertia, for the purpose of successfully playing abruptly, warped records, while, also, obtaining an extremely low value of resonant frequency of pickup arm means, for obviating distortion, due to pickup arm means resonance, in the reproduced sound; and while still further obtaining substantially the same length of pickup arm from pivot for vertical movement of pickup arm, to stylus, as from pivot for lateral movement of pickup arm, to stylus, for the purpose of obviating wow in the reproduced sound due to the pickup arm, while playing warped records.*

Another problem is created in certain abnormally, warped records which possess an abrupt, warp, in that they are warped so that during the playing thereof, instead of gradually raising and lowering the vertically movable portion of a pickup arm, they are constantly very rapidly thrusting the vertically movable portion of the pickup arm upward. At the start, of a rapid upward thrust of the vertically movable portion of the usual pickup arm (which usual pickup arm refers to a pickup arm having substantially equal vertically, and laterally, movable pickup arm lengths) caused by such an abruptly, warped record, the inertia of the vertically movable portion of the usual pickup arm, which inertia is substantially the same as the inertia of the laterally movable portion, by naturally resisting the rapid upward thrust, obviously tends to cause the stylus of the arm, then to increase its downward force on the record groove. This action normally tends to increase stylus and record groove wear. At the completion, of a rapid upward thrust of the vertically movable portion of the usual pickup arm caused by such abruptly, warped records, the upward momentum thus acquired by the vertically movable portion of the usual pickup arm, obviously tends to cause the stylus of the arm, then, to considerably decrease its downward, vertical force on the record groove, which action, when the downward stylus tracking force becomes too small in value, normally tends to introduce distortion into the reproduced sound; and, in some cases, causes the stylus to actually leave contact with the record groove. Moreover, when playing such abruptly, warped records, the usual pickup arm means becomes more sensitive to vibrations of the floor which supports it.

The pickup arm means of this invention virtually overcomes the aforesaid downward stylus tracking force drawback in the playing of such abnormally, abruptly warped records, while, also, obviating wow in the reproduced sound due to the pickup arm means, while playing all warped records. This additional novel result in the playing of warped records by this pickup arm means is afforded by providing an improved mass distribution of the pickup arm means which is, also, in accord with the requirements for obviating highly undesirable pickup arm means resonance.

Resonance is the phenomenon which results when, in the case of a forced vibration, the period of the force equals that of a natural vibration of the system to which the force is applied. It consists of a vibration of large amplitude in the system.

Pickup arm means resonance of course refers to resonant vibration of a pickup means, or system, which is caused when stylus vibrations, at a certain frequency, from the sound-engravings on the record groove, in addition to vibrating the sound pickup itself, undesirably also vibrate a pickup arm means at its natural period of vibration and thereby in turn cause resultant highly undesirable resonant vibration of the pickup arm means, which resonant vibration of the pickup arm means, in turn, of course, imposes unwanted vibration on its stylus which unwanted stylus vibration in turn creates distortion of the reproduced sound, as well as possible damage to the sound-engravings on the record groove. Mass of a pickup arm means is of course highly stable, and therefore novel distribution of the mass of the pickup arm means both laterally and vertically, and also the downward, vertical stylus tracking force on the record groove, are the prime means used for enabling the embodiment of this pickup arm means shown in FIG. 1 to resist and thereby prevent said undesirable resonant pickup arm vibration, caused by the stylus vibration, at a certain frequency, from the record groove.

To solve the abruptly, warped record playing problem without imposing other drawbacks: such as, undesirable pickup arm means resonance and/or a short vertically movable length of pickup arm 64 as is shown in FIG. 6, which imposes wow in the reproduced sound when playing warped records; in this invention novel use is made of the downward, vertical stylus tracking force of a pickup arm means, as well as addition of the mass 18 to a laterally movable portion of the pickup arm means, in preventing undesirable resonance of the pickup arm means, as will be shown in the following:

The vertically movable mass of the pickup arm means of this invention, which includes the pickup arm 1 and 61, the counterweight 5, and the sound pickup support 2 (and, thus, also, the inertia and momentum of said vertically movable mass of the pickup arm means, since inertia and momentum are directly proportional to mass) is considerably reduced to a point wherein the vertical inertia, of said vertically movable mass of the pickup arm means, plus the, aiding, downward, vertical stylus tracking force of the vertically movable mass of the pickup arm means, are combined to provide a predetermined ample, but no excess, amount of vertical resistance of the pickup arm means to vertical stylus vibrations from the record groove, which thereby definitely establishes the desired preselected very low value of resonant frequency of the pickup arm means, vertically. Furthermore, said predetermined reduced vertically movable mass of the pickup arm means, plus the, aiding, downward, vertical stylus tracking force of the pickup arm means, thereby, also prevent, all, stylus vibrations which are created from sound-engravings, which are normally engraved on a record groove, from undesirably vibrating the pickup arm means, vertically, so that all, vertical, stylus vibrations which are normally created from stereo records are, under all operating conditions, received, as they obviously should be, solely by the sound pickup; whereby none of the sound recorded, vertically, on a record is undesirably lost in vibrating the pickup arm, vertically.

However, in thus reducing the vertical inertia of the pickup arm means, the lateral inertia of the pickup arm means (which lateral inertia includes, as does the vertical inertia, the inertia of the pickup arm 1 and 61, the counterweight 5, and the sound pickup support 2) is, obviously, consequently, automatically, also reduced the same amount, as can be seen from FIG. 1. But, since the lateral inertial resistance of the pickup arm means to said vibrations, obviously, is not at all aided by the downward, vertical stylus tracking force of the pickup arm means; in this invention a predetermined mass 18 is formed to, and is in lateral static balance with respect to, solely a laterally movable portion of the pickup arm means, namely, the vertical tube 17, to add sufficient lateral inertia to the lateral inertia of said pickup arm means to thereby provide a predetermined ample amount of lateral resistance of the pickup arm means to lateral stylus vibrations from the record groove, which thereby establishes a desired very low value of resonant frequency of the pickup arm means, laterally, to thereby also prevent undesirably pickup arm means resonance, laterally. Furthermore, the lateral inertia of said predetermined mass 18 added solely to a laterally movable portion of the pickup arm means, plus the lateral inertia of the pickup arm 1 and 61, the counterweight 5, and the sound pickup support 2, thereby, also prevent, all, stylus vibrations which are created from sound-engravings, which are normally engraved on a record groove, from undesirably vibrating the pickup arm means, laterally, so that all, lateral, stylus vibrations which are normally created from records are, under all operating conditions, received, as they obviously should be, solely by the sound pickup; whereby none of the sound recorded, laterally, on a record is lost in vibrating the pickup arm, laterally.

It is pointed out that the so-called spurious vibrations in various portions of a poorly constructed pickup arm means are very easily obviated, in that only a normal, sound mechanical construction of a pickup arm means is required to obviate such vibrations, and it is assumed that the pickup arm means embodying this invention is of normal, sound mechanical construction.

In connection with the above, it is pointed out that when the inertia of a pickup arm means is sufficiently large in value, it is a well established physical fact that the resonant frequency of the pickup arm means will be considerably lower than any audible frequency, and lower than any frequency normally engraved on a record: for example, much less than 15 cycles per second. Whereby, increasing the lateral inertia of this pickup arm means (which lateral inertia was reduced when the vertical inertia was reduced, as explained above) by adding the mass

18, enables the pickup arm means, during all actual record playing to actually be non-resonant, laterally.

Similarly, it is well established that resisting forces on any system (which resisting force, in the above case, for lowering the pickup arm means resonant frequency, vertically, includes the downward, vertical stylus tracking force for holding the stylus on the record groove) will likewise lower the value of the resonant frequency of the system. Accordingly, this phenomenon was utilized in utilizing the downward, vertical stylus tracking force in the obtainment of the desired low value of the pickup arm means resonant frequency, vertically; which, thereby, very desirably enabled greatly reducing the vertical inertia, as explained above.

Also, in establishing the low resonant frequency of the pickup arm means, both laterally and vertically, which is to be used for all modern sound pickups, it is desirable to select a sound pickup having a relatively low stylus compliance, the stiff stylus suspension of which, of course will be the most likely to vibrate and resonate a pickup arm means. Whereby, all modern sound pickups having higher stylus compliance ratings (more flexible stylus suspensions), also, of course will not vibrate or resonate the pickup arm means at any frequency normally recorded on a record.

Also, it is to be understood that while in considering the mass of the vertically movable portion of the pickup arm means the mass of the sound pickup was not mentioned, this was done because modern sound pickup weight of respective sound pickups varies from as low as 2 grams to 19 grams, and it is therefore believed that it is preferable that the resonant properties of the pickup arm means itself be suitable for the lightest weight available sound pickup, which very light weight is almost insignificant. However, it is to be understood that, if so desired, a sound pickup of a preselected weight may be included as a part of the pickup arm means inertia when establishing pickup arm means resonance. It is also to be understood that if so desired, more than a minimum required inertia of the vertically movable portion of the pickup arm means may be utilized wherein it will still be advantageous to attach an inertial mass to a laterally movable portion of the pickup arm means.

Thus, in the embodiment of this pickup arm means shown in FIG. 1, a predetermined, desired, lateral and vertical, resonant frequency of the pickup arm means which frequency is inaudible, and is not normally engraved on the grooves of any records to excite the pickup arm means into resonance (for example, less than 15 cycles per second), is respectively, independently, obtained in such a way that the vertical inertia is very much less than the lateral inertia of the pickup arm means, to thereby, at the same time, solve the abruptly, warped record playing problem by considerably reducing the vertical inertia and thus also the vertical momentum of the vertically movable portion of the pickup arm means. This is accomplished while, also, obtaining substantially at least the same pivot which is journaled in the bearings 7, to stylus 4 length, as the pivot which is journaled in the bearing 9, to stylus 4 length, of pickup arm 1, for providing the extremely flat arc A shown in FIG. 1 for the vertical path of the stylus 4, for in turn obviating wow in the reproduced sound due to the pickup arm while playing warped records, and for minimizing tracking distortion both during the playing of warped records and in automatic record-changing. The reasons for these latter results have been explained in detail hereinbefore.

It is to be understood that in order to provide a pickup arm means on which changes of temperature have substantially no effect whatever, it is possible, while retaining the advantages of this pickup arm means, and preferable, to use a very thin (extremely low viscosity) lubricant in both pivot bearings 7 and 9 of the pickup arm means shown in FIG. 1.

It is pointed out, in connection with the above, that the intensity of stylus vibration created from the sound-engravings on a record groove is substantially equal laterally and vertically for stereo records, due to the 45 degree incline possessed by each wall of a record groove and the manner in which the stereo sound-engravings are engraved on the groove.

Prior to this invention, a pickup arm means having a smaller value of vertically movable, than laterally movable, inertia, which thus was also in accord with the abovesaid requirements for obviating highly undesirable pickup arm means resonance, and was further adequate, in providing a sufficiently small inertia for the vertically movable portion of the pickup arm means, for affording satisfactory improvement in the above-stated stylus tracking force drawback which was caused while playing said abruptly, warped records was attempted and obtained but, only, by simply shortening the pivot 39 for vertical movement of the pickup arm, to stylus 42 length of the pickup arm 64 as is shown in FIG. 6, which very objectionably then introduced wows into the reproduced sound when playing warped records, in a manner hereinbefore explained in connection with a prior device shown in FIG. 6.

In contrast to the pickup arm means of FIG. 6, as aforesaid, the pickup arm means according to this invention shown in FIG. 1 is a novel improvement which enables a highly desirable very low value of mass for its vertically movable portion, while, also, maintaining the highly desirable pivot for vertical movement of the pickup arm which pivot is journaled in bearings 7, to stylus 4 full pickup arm length for wow-obviation due to the pickup arm when playing warped records, and for minimizing tracking distortion both when playing warped records and in automatic record-changing as has been explained hereinbefore; and still further also obtains a highly desirable low value of resonant frequency for minimizing distortion in the reproduced sound, primarily by virtue of its damping mass 18 shown in FIG. 1 which mass is formed and associated solely with a laterally movable portion of the pickup arm means, which has been explained in considerable detail above.

*Test results of experimental model, in connection with disclosure set forth under last mentioned title*

In the experimental model of the pickup arm means embodying this invention, it was, actually, found that by decreasing the vertical, while increasing the lateral, inertia, and thereby also decreasing the vertical momentum of the pickup arm means, that the downward, vertical stylus tracking force on the record groove could be significantly reduced in value, without the addition of any tracking distortion on the loudest sound passages, and also with an elimination of stylus groove jumping which, prior to said inertia change, had been caused when walking on an unstable floor which supported the apparatus. All abruptly, warped records which heretofore would not track at a downward, vertical stylus force of one gram now tracked perfectly at a downward, vertical stylus force of less than one gram, and without adverse effects from the unstable floor condition.

Furthermore, test records which tested for pickup arm means resonance down to 5 cycles per second (a frequency value which is far less than created by even the lowest musical note of 16 cycles per second, said to be produced by 32 foot organ pipes which notes are said to be felt rather than heard) created no pickup arm means resonance when using various sound pickups, even when using a sound pickup having a very low stylus compliance rating of $2 \times 10^{-6}$ centimeters per dyne. Such a relatively stiffly suspended stylus has a great tendency to vibrate the pickup arm rather than the sound pickup itself. It is, however, pointed out that when such a sound pickup having a relatively stiff stylus suspension is used that the downward, vertical stylus tracking force must be relatively enormously increased, which, of course, greatly aids this pickup arm means, even though it possesses an extremely small value of vertical inertia for its vertically movable portion, to still remain free of resonance at such extremely low frequencies.

*Balancing of pickup arm means which is devoid of springs, relative to its pivot which supports it for lateral movement, by a single longitudinal adjustment*

Referring primarily to FIGS. 1 and 2, when this pickup arm means is adjusted, for various preselected, downward stylus tracking forces for various modern sound pickups weighing different respective amounts, solely, by adjusting the counterweight 5, and when the vertical tube 8 is also inclined at any angle up to an angle of at least 15 degrees from the vertical, the total mass of the entire laterally movable portion of this pickup arm means (which pickup arm means is devoid of springs), solely by a single longitudinal adjustment of the mass 20 is maintained sufficiently in balance relative to the axis of rotation for its lateral movement, which axis of rotation is on the axis of the tube 8, so that the stylus of the pickup arm can be maintained motionless, when it is held elevated at any position, and it is free to move to any other position, directly above any of the playing surface of a record 23 on the turntable 24. Said holding of said elevation of the stylus above the playing surface of the record 23 is obtained by placing a spacer piece between the underside of the pickup arm 1 and the lower edge of the opening through which the pickup arm 1 passes. Such a range of angles of inclination of the vertical tube 8, and in turn of the entire pickup arm means, obviously more than includes all practical angles of inclination which would ever normally occur in the actual playing of records. Said angle of inclination of at least 15 degrees, for such balancing of the pickup arm means relative to the axis of rotation for its lateral movement, should be considerably exceeded, if required for some reason, by carefully forming the pickup arm 1 in the manner which will be explained hereinafter.

Referring to FIG. 2, by forming an appropriate lateral bend 37 in the pickup arm 1, the manner of determining the actual angles and location of said bend will be explained in detail hereinafter, the counterweight 5 can be suitably adjusted to provide balance of the total mass of the entire laterally movable portion of the pickup arm means relative to the axis of rotation which supports the pickup arm means for lateral movement, when the pickup arm means is inclined at any angle up to an angle of at least 15 degrees from its normal position. Said axis of rotation for lateral movement of the pickup arm means is on the axis of the tube 8 and is on the center of the tube 8 as the tube 8 is shown in FIG. 2. Such balancing of the pickup arm means by the counterweight 5 is obtained because the pickup arm 1 is so formed by the agency of the bend 37 that the center-line of the mass of the counterweight 5 as well as the center-line of the total mass of the entire laterally movable portion of the pickup arm means (which total mass includes the mass of a preselected sound pickup means, the mass of the sound pickup support 2, the mass of the pickup arm 1 and 61, and the mass of the counterweight 5), actually, or is so close that for the desired result it in effect, passes through the axis of rotation of said pivot which supports the pickup arm means for lateral movement, which axis, as aforesaid, is on the center of the tube 8 as shown in FIG. 2. Thus, by suitable adjustment of the counterweight 5, the center of gravity of the total mass of the entire laterally movable portion of the pickup arm means, actually, or is so close that for the desired result it in effect, coincides with the axis of rotation for lateral movement of the pickup arm means and said balance of the pickup arm means is obtained.

Further, the pickup arm is also so formed by the agency of said appropriate lateral bend 37 in the pickup arm 1, that the center-line of the mass of the preselected sound pickup 3 itself, and the center-line of the mass of the counterweight 5 itself, each, at all times, actually, or is so close that for the desired result it in effect, coincides, and forms a common center-line, with the aforesaid center-line of the total mass of the entire laterally movable portion of the pickup arm means. Accordingly, the center-line of the mass of the sound pickup 3 itself and the center-line of the mass of the counterweight 5 itself, each, as does the center-line of the total mass of the entire laterally movable portion of the pickup arm means, likewise, actually, or is so close that for the desired result it in effect, passes through the axis of rotation of the pivot which supports the pickup arm means for lateral movement which axis is on the center of tube 8 as shown in FIG. 2. Thereby, also for various, modern sound pickups, having different respective weights, being respectively used, the aforesaid balance of the pickup arm means relative to its pivot for its lateral movement likewise can be achieved by adjusting the counterweight 5.

Still further, referring to FIGS. 1 and 2, solely the counterweight 5 of this pickup arm means is adjusted to provide the entire value of preselected, downward, vertical stylus tracking force on a record. The imbalance, thus created by such adjustment of the counterweight 5, which is then possessed by the laterally movable portion of the pickup arm means relative to its axis of rotation of its pivot for its lateral movement, which axis of rotation is on the center of tube 8 as shown in FIG. 2, is then balanced out by a single adjustment made longitudinally to the longitudinally adjustable mass 20. Such adjustment of the longitudinally adjustable mass 20 causes the center of gravity of the total mass of the entire laterally movable portion of the pickup arm means actually to coincide, or to be so close that for the desired result it in effect coincides, with the axis of rotation of the pivot for lateral movement of the pickup arm means. This balancing of the total mass of the entire laterally movable portion of the pickup arm means is provided by the adjustment of mass 20, since the center-line of the mass 20 is in the same vertical plane as the center-line of the mass of the counterweight 5, and, hence, the center-line of the mass 20 is also on the same center-line as the center-line of the mass of the counterweight 5 relative to the said axis of rotation of the pivot for lateral movement of the pickup arm means. Accordingly, as does the center-line of the mass of the counterweight 5, the center-line of the mass 20, actually, or is so close that for the desired result it in effect, likewise, does the following: passes through the axis of rotation of the pivot for lateral movement of the pickup arm means which axis of rotation is on the center of the tube 8 as shown in FIG. 2, is on the same center-line as the center-line of the mass of the sound pickup 3 relative to said axis of rotation, and is common to the aforesaid center-line of the total mass of the entire laterally movable portion of the pickup arm means which center-line also passes through said axis of rotation of the pivot for lateral movement of the pickup arm means.

Accordingly, by suitable adjusting of the mass 20, the aforesaid balancing of this pickup arm means relative to its pivot for its lateral movement, which pivot is journaled in the bearing 9, is achieved for various values of downward, vertical stylus tracking force on a record which downward stylus tracking forces are obtained, solely, by adjusting the counterweight 5, and when the pickup arm means is provided with various respective sound pickups, having different respective weights, respectively installed thereon, and without the use of any springs.

It is to be understood, that, for convenience, the longitudinal shaft 19 is to be calibrated, in accordance with the balancing fully described under this heading, with divisions on its circumferential surface that are spaced apart in a longitudinal direction along the shaft 19, which divisions correspond to the values of downward stylus tracking force that may be used so that the mass 20 may, for any value of downward stylus tracking force that is preselected, be quickly set to a corresponding division on the shaft 19 for then quickly affording, the hereinbefore described under this heading, balancing of the pickup arm means relative to the axis of rotation of the pivot which supports it for its lateral movement, which axis is on the center of tube 8 as shown in FIG. 2.

Moreover, because the mass 20 is connected with, solely, a laterally movable portion of the pickup arm means, namely, the vertical tube 8, the mass 20 can not in any way affect the downward, vertical stylus tracking force as does the counterweight 5. In effect, the longitudinally adjustable mass 20 performs the same said, lateral, balancing as the counterweight 5, and takes over for the counterweight 5, after the counterweight 5 has been adjusted to provide a preselected, downward, vertical stylus tracking force on a record, since the counterweight 5, then, has imbalanced, and can not entirely balance, the pickup arm means relative to said axis of rotation of the pivot for lateral movement of the pickup arm means, while, also, providing said preselected, downward stylus tracking force.

Accordingly, the novel pickup arm means of this invention provides said balancing of the pickup arm means relative to its pivot for its lateral movement, while being devoid of springs. Balancing of the pickup arm means obviates the danger of the pickup arm means becoming imbalanced at any time due to a usual changed position of the entire record player assembly, when said changed position alters leveling of the record player assembly. Further accordingly, this highly stable pickup arm means which is devoid of springs and is balanced as aforesaid, is thus devoid of the danger of the stylus tracking force, unknowingly to the user, becoming too large or too small at various times, due to the permanent, stretching or compressing of a spring or springs. Also, obviation of springs in the pickup arm means obviates a source of possible failure. The aforesaid balance of the laterally movable portion of this pickup arm means relative to its pivot journaled in the bearing 9 obviates any necessity of leveling the entire record player assembly, as was heretofore required for pickup arm means, which were devoid of springs for controlling their downward stylus tracking force.

The actual procedure used in definitely establishing the location and angle of the lateral bend 37 formed in the pickup arm 1 of FIG. 2, was, first, to visually approximate the lateral bend 37 in the pickup arm 1 so that, by visual inspection, the center-line of the mass of the counterweight 5, the center-line of the mass of a sound pickup 3, and the center-line of the total mass of the entire laterally movable portion of the pickup arm means, all appeared to be on a common center-line, and said common center-line also visually appeared to pass through the axis of rotation for lateral movement of the pickup arm means, which axis of rotation is on the center of the vertical tube 8 as shown in FIG. 2. Then, the stylus of the pickup arm means was elevated above the playing surface of a record by inserting a spacer piece between the underside of the pickup arm 1 and the lower edge of the opening in the vertical tube 8 through which the pickup arm 1 passes through. Said elevation of the stylus of the pickup arm means was respectively provided for various, respective preselected, downward stylus tracking forces which were preselected by respective adjustment of the counterweight 5, and for various, respective, preselected, equivalent weights of sound pickups which were respectively installed on the sound pickup support 2 of the pickup arm means in a definite preselected location which location was on the aforesaid center-line. While the stylus of the pickup arm means was thus elevated, the vertical tube 8, and thus also the entire record player assembly, was inclined to angles of at least 15 degrees in all directions. Then, small adjustments of the bend 37 were made, as required, until it was found that the mass 20 was capable of being longitudinally adjusted so that it balanced the pickup arm means relative to its axis of rotation for its lateral movement, when the vertical tube 8, and in turn the entire record player assembly, was inclined to an angle of at least 15 degrees in all directions, for each said respective downward, vertical stylus tracking force for which the counterweight 5 was adjusted, as well as for each said respective installation of an equivalent mass of a sound pickup. Thus, the location and angle of said lateral bend 37 in the pickup arm 1 was definitely and permanently established.

*Test results of experimental model in connection with disclosure set forth under last mentioned title*

In the experimental model of the pickup arm mass embodying this invention, it was actually found that the pickup arm means (which pickup arm means is entirely devoid of springs) could be balanced relative to its pivot for its lateral movement (by means of a single longitudinal adjustment of the longitudinally adjustable mass 20) so that tilting of the entire record player assembly in excess of 15 degrees (which is far more than is ever dictated by practical requirements) from the position in which its mounting plate 15 is horizontal, in any direction, created no imbalance to the pickup arm means whatsoever relative to its pivot for its lateral movement, for various modern sound pickup weights and downward, vertical stylus tracking force values adjusted for by the counterweight 5.

This balancing was accurately obtained, and checked, by placing a spacer piece between the lower edge of the opening in the vertical tube 8, which the pickup arm 1 and 61 passes through, and the underside of the pickup arm 1, so that the pickup arm 1 was maintained in a raised position above the top surface of a record on the turntable, and then tilting the turntable, in all directions, to amounts up to at least 15 degrees to the horizontal, in which positions it was found that the pickup arm 1 remained motionless over any of the playing surface of a record, after making a suitable longitudinal adjustment of the mass 20. This test, considering that an anti-friction ball-type bearing was used in the pivot, for lateral movement of the pickup arm means, of the experimental model is obviously quite a severe test.

Accordingly, and also in accord with certain of the foregoing, records which were warped, either gradually or abruptly, were played with the experimental model of this invention at downward, vertical stylus tracking forces of less than one gram, and with the entire record player assembly tilted to at least 15 degrees, and with a pickup arm means which was devoid of springs.

*Balancing of pickup arm means relative to its pivot which supports it for lateral movement, by a longitudinal, as well as an angular, adjustment*

FIG. 5 shows another embodiment of this invention which shows a rotatable mass 50 using a collar 48 which mass 50 and collar 48 and also shaft 49 are used primarily for balancing the pickup arm means relative to the pivot for lateral movement of the pickup arm means which pivot, as shown in FIG. 3, is journaled in the bearing 9. This alternate embodiment of this invention was used primarily for effectively balancing the pickup arm means relative to the pivot journaled in the bearing 9, prior to the refinement of the embodiment of the invention shown in FIG. 1, which refinement shown in FIG. 1, also of course affords the aforesaid, additional, novel results: such as, requiring merely a single, longitudinal, adjustment, and, furthermore, there is less lateral imbalance to be balanced out in the refined embodiment by virtue of the bend 37 of FIG. 2. In this embodiment shown in FIG. 5, the collar 48 is rotatable about the vertical shaft 8 and because the shaft 49 is threaded to the collar 48 the shaft 49 can be readily locked to the shaft 8 in any desired angular position. Also, the mass 50 is longitudinally slidable along the shaft 49 and can be locked thereto by the set screw 51 to provide further variations for balancing the pickup arm means relative to its pivot journaled in the bearing 9.

*Fine adjustment means for stylus tracking force, which adjustment means does not alter the overall inertia of the pickup arm means*

In an embodiment of this pickup arm means shown in FIG. 7, a quick, fine adjustment, of the counterbalancing of the pickup arm is obtained by the small mass 28', which is in the form of a circular collar which is longitudinally slidable along the counterweight 54 and is affixed thereto by the set screw 32 in preselected positions relative to the pivot journaled in the bearing 7. Because the mass 28' is not on the same side of the pivot journaled in the bearing 7, as the sound pickup 3 which is being counterbalanced, the mass 28' in effect combines with the mass of the counterweight 54 and thus does not add to, or alter, the overall inertia of the pickup arm means. It is significant in this embodiment of the pickup arm means that the center-line of the mass of the collar 28' is on the same center-line as the center-line of the mass of the counterweight 54, whereby all of the foregoing results are retained when using the collar 28'.

Another important feature of the small mass 28' is that it may also be used as a means for, very accurately, preselecting, obtaining, and measuring the actual value of, downward, stylus tracking force applied on the record, without the use of an external independent weighing scale, and without the use of springs. This may be accomplished by first locating small mass 28' in a position in which its flat upright surface, that is farthest away from the pivot journaled in the bearing 7, is flush, or in other words in the same plane, with the flat upright surface of counterweight 54 that is farthest away from the bearing 7. Next, the counterweight 54 (while the small mass 28' is being maintained in the said position wherein its flat upright surface, that is farthest away from the pivot journaled in the bearing 7, is flush with the flat upright surface of the counterweight 54 that is farthest away from the bearing 7) is adjusted, by sliding on the pickup arm 61, until the pickup arm is balanced with respect to the pivot journaled in the bearing 7 for up and down movement of the pickup arm 1. The counterweight 54 is, then, affixed to the pickup arm 61 by the set screw 55. The counterweight 54 is to have divisions marked thereon on its outer circumferential surface that are spaced apart in a longitudinal direction, which divisions are calibrated to indicate weight, preferably, but not necessarily, in tenths of a gram; whereby, when small mass 28' is slid (from its said position wherein its flat upright surface, that is farthest away from the pivot journaled in the bearing 7, is flush with the flat upright surface of the counterweight 54 that is farthest away from the bearing 7) longitudinally along the counterweight 28' toward the pivot journaled in the bearing 7 to a preselected location, the downward stylus tracking force is, then, adjusted in accordance with the said divisions calibrated on the outer circumferential surface that are spaced apart in a longitudinal direction on the counterweight 54. Because of the relatively small mass of the small mass 28', the calibrated divisions for say each "one tenth" of a gram, downward, stylus tracking force may be say as much as $\frac{1}{16}$ or $\frac{3}{32}$ of an inch apart, or even more or less than this amount, depending on the value of the weight of the small mass 28' that is preselected.

Accordingly, the necessity for using an—independent—external weight measuring scale is eliminated since the small mass 28', obtains and measures the value of downward stylus tracking force—very accurately—quite easily, and without requiring the use of any springs, for values of downward stylus tracking force on the order of "tenths" of a gram. Accurate measurements of downward stylus tracking force in values on the order of "tenths" of a gram is vital for today's sound pickup cartridges which track record grooves at "less" than one gram, where every tenth of a gram is highly significant. With the said system of measuring downward stylus tracking force, it is pointed out that the user can, at all times, readily see, at a glance, the value of downward stylus tracking force that is being applied to the record, and by a means that is devoid of springs, and by a pickup arm means that requires no leveling of the record player.

It is to be understood that the small mass 28' may also be preset at many other positions (other than said position wherein its flat upright surface that is farthest away from the pivot journaled in the bearing 7, is flush with the flat upright surface of the counterweight 54 that is farthest away from the bearing 7) along the counterweight 54, when the counterweight 54 is adjusted to balance the pickup arm means with respect to the pivot journaled in the bearing 7—and that the counterweight 54 may also be adjusted to a preselected value of downward stylus tracking force by an independent weight scale —and that in either case the calibrated divisions on the counterweight 54 will, then, serve to vary the value of downward stylus tracking force in accordance with their calibration.

It is also noteworthy, that if the tracking ability of sound pickup cartridges improves sufficiently in the future to warrant it, the aforesaid calibration can be made in fractions of even less than tenths of a gram, and if so desired the aforesaid calibration can be made for values greater than tenths of a gram.

It is important and significant that even if the counterweight 54 is not calibrated with any divisions, the small mass 28' will of course still provide an easy, relatively quick, adjustment for obtaining very fine, or small, values of downward stylus tracking force, for example for values in "tenths" of a gram, as explained in the first paragraph of this heading.

*In conclusion*

While, for the purpose of clarification, the many novel results afforded by various combinations of the structure of this pickup arm means have been set forth and grouped under various separate titles, it is, however, pointed out that these novel results can all be obtained in a complete combination of this entire pickup arm means which has been disclosed, or the correspondent novel results of various desired combinations of this pickup arm means can be obtained, and, in either case, not any of the results thus obtained can possibly defeat another said result, as has been known to have occurred in prior pickup arm means, as explained hereinabove.

Features disclosed herein may be used in an independent pickup arm means for purely manual record playing, in a pickup arm means used in an automatic record player, or in a pickup arm means used in an automatic record-changer.

While each of the forms of embodiment of the invention as herein disclosed constitutes a particular form, it is to be understood that other forms might be adopted as may come within the scope of the claims which follow.

What is claimed is as follows:

1. A pickup arm assembly for a sound pickup means, said pickup arm assembly being supported for lateral and up and down movement, for playing disk records on a rotary turntable means, wherein said pickup arm assembly includes: a sound pickup support means having a pickup arm means; said sound pickup support means being disposed, with respect to the pickup arm means, for supporting a sound pickup means with the stylus of the sound pickup means being located at one of the distal ends of the pickup arm means; a first pivot means for supporting said pickup arm means for up and down movement, said first pivot means being located between both distal ends of said pickup arm means; a counterweight means which is at all times positioned on said pickup arm means on the opposite side of said first pivot means from that side on which the stylus of the sound pickup means is located, said counterweight means being capable of being affixed to said pickup arm means in preselected positions relative to said pickup arm means and to said first pivot means to provide a preselected, downward, stylus tracking force when said sound pickup support means is equipped with a sound pickup means; said pickup arm means being so constructed and arranged, vertically, so that (the, longitudinal, center-line of) the, total, mass of said combination of, said pickup arm means, said counterweight means, said sound pickup support means, and said preselected sound pickup means (which total mass is pivoted about its said first pivot means for its up and down movement) passes in limits, from, actually, through the axis of rotation of said first pivot means for up and down movement, to close enough, to the axis of rotation of said first pivot means for up and down movement, so that, said, preselected, downward, stylus force, when measured at the stylus, is maintained the same, with 0.1 of one gram, at all elevation points, from zero to ¾ of an inch, above the top surface of the rotary turntable means.

2. The pickup arm assembly set forth in claim 1, wherein said counterweight means includes a counterweight and a mass means, said mass means being cabale of being positioned on said counterweight, in preselected positions relative to said counterweight in a longitudinal direction, wherein said counterweight is in the form of a sleeve and said mass means is in the form of a sleeve, said mass means being in concentric relation to said counterweight, and said mass means being smaller in weight than said counterweight and being movable for fine adjustment on said counterweight while said counterweight remains stationary; whereby, after approximately adjusting the downward stylus tracking force by the counterweight means, various adjustments for very fine small values of downward stylus tracking force can be easily and quickly obtained by positioning said mass means longitudinally on said counterweight while maintaining the feature of claim 1.

3. The pickup arm assembly set forth in claim 1, wherein the pickup arm assembly further includes: a means for supporting said first pivot means; a second pivot means for supporting said support means for rotational movement and for thereby permitting lateral movement of the pickup arm assembly; a mass means attached to said support means, said mass means being adjustable to balance the pickup arm assembly relative to its said second pivot means for its lateral movement.

4. The pickup arm assembly set forth in claim 3, wherein said mass means includes means on which it is adjustable with respect to said support means to vary its spacing therefrom.

5. The pickup arm assembly set forth in claim 4, wherein said mass means is in substantially the same vertical plane as the counterweight means.

6. The pickup arm assembly set forth in claim 5, wherein the pickup arm assembly is formed so that the center-line of the total mass of the combination of the pickup arm means with said counterweight means, said sound pickup support means, and a preselected sound pickup means, which total mass is pivoted about its said second pivot means for its lateral movement, passes substantially through the axis of rotation of its said second pivot means for its lateral movement.

7. A pickup arm assembly for a sound pickup means, said pickup arm assembly being supported for lateral and up and down movement, for playing disk records on a rotary turntable means, wherein said pickup arm assembly includes: a sound pickup support means having a pickup arm; said sound pickup support means being disposed, with respect to the pickup arm, for supporting a sound pickup means with the stylus of the sound pickup means being located at one of the distal ends of the pickup arm; a first pivot means for supporting said pickup arm for up and down movement, said first pivot means being located between both distal ends of said pickup arm; a counterweight means which is at all times positioned on said pickup arm on the opposite side of said first pivot means from that side on which the stylus of the sound pickup means is located, said counterweight means being capable of being affixed to said pickup arm in preselected positions relative to said pickup arm and to said first pivot means to provide a preselected, downward, stylus tracking force when said sound pickup support means is equipped with a preselected sound pickup means; a vertical support means for supporting said first pivot means; a second pivot means for supporting said vertical support means for rotational movement and for thereby permitting lateral movement of the pickup arm; said pickup arm being formed so that the center-line of the total mass of said combination of the pickup arm with said counterweight means, said sound pickup support means, and a preselected sound pickup means, which total mass is pivoted about its said second pivot means for its lateral movement, passes substantially through the axis of rotation of said second pivot means; whereby, by a suitable adjustment of the counterweight means relative to the pickup arm and to said first pivot means, balancing of the pickup arm assembly relative to the axis of rotation of the second pivot means is obtained when said vertical support means is inclined at any angle up to an angle of at least 15 degrees from the vertical; and a mass means which includes a mass and a supporting member therefor, said supporting member being fixed to and extending from said vertical support means, said mass being carried on said supporting member and movable thereon with respect to the vertical support means to vary the spacing of said mass relative to said vertical support means, and said mass means being substantially in the same vertical plane as the counterweight means; whereby, for a pickup arm assembly devoid of springs, when the pickup arm assembly has been imbalanced by said adjustment of the counterweight means in said obtaining of the preselected, downward, vertical stylus tracking force, said adjustable mass means by a single adjustment can balance the pickup arm assembly relative to the axis of rotation of its pivot for its lateral movement when said vertical support means is inclined at any angle up to an angle of at least 15 degrees from the vertical.

8. A pickup arm assembly for a sound pickup means, said pickup arm assembly being supported for lateral and up and down movement, for playing disk records on a rotary turntable means, wherein said pickup arm assembly includes: a pickup arm for supporting a sound pickup means with the stylus of the sound pickup means being located at one of the distal ends of the pickup arm; a first pivot means for supporting said pickup arm for up and down movement; a support means for supporting said first pivot means; a second pivot means for supporting said support means for rotational movement and for thereby permitting lateral movement of the pickup arm; a mass means having a value of inertia that is predetermined to provide the value of low frequency pickup arm means resonance that is preselected, said mass means being attached to a portion of said support means; and the first pivot means being so related to the second pivot means that the horizontal distance from the first pivot means to the stylus is substantially at least as much as the horizontal distance from the second pivot means to the stylus; whereby, the inertia of the vertically movable portion of the pickup arm assembly can be reduced for improved tracking by the stylus, even though the inertia of the laterally movable portion of the pickup arm assembly is being maintained adequate for obtaining a low resonant frequency of the pickup arm means, and at the same time a full length vertically movable portion of the pickup arm is being provided for minimizing wow when playing warped records.

9. A pickup arm assembly for a sound pickup means, said pickup arm assembly being supported for lateral and up and down movement, for playing disk records on a rotary turntable means, wherein said pickup arm assembly includes: a pickup arm; a support means for supporting said pickup arm for up and down movement; a pivot means for supporting said support means for rotational movement and for thereby permitting lateral movement of the pickup arm; a mass means attached to said support means, said mass means being adjustable to balance the pickup arm assembly relative to its pivot means for its lateral movement.

10. The pickup arm assembly set forth in claim 9, wherein said support means includes a vertical shaft and wherein said mass means is shiftable about said vertical shaft to different circumferential positions with respect thereto, and means included in said mass means for attaching said mass means to said vertical shaft in any circumferentially adjusted position of said mass means.

11. The pickup arm assembly set forth in claim 10, wherein said mass means also includes means on which it is adjustable with respect to said vertical shaft to vary its spacing therefrom.

12. The pickup arm assembly set forth in claim 9, wherein the pickup arm assembly further includes: a counterweight means which is at all times positioned on said pickup arm on the opposite side of said support means from that side on which the stylus of the sound pickup means is located, said counterweight means being capable of being affixed to said pickup arm in preselected positions relative to said pickup arm and to said support means to provide a preselected, downward, stylus tracking force when said pickup arm assembly is equipped with a sound pickup means; and wherein said mass means includes means on which it is adjustable with respect to the support means to vary its spacing therefrom and wherein said mass means is in substantially the same vertical plane as said counterweight means.

13. The pickup arm assembly set forth in claim 12, wherein said means on which said mass means is adjustable has divisions on its outer surface spaced apart in a longitudinal direction, which divisions are calibrated to correspond to values of downward stylus tracking force so that the mass means, for any value of downward stylus tracking force that is preselected, by being positioned at the corresponding division on said means on which the mass means is adjustable, balances the pickup arm assembly relative to said second pivot means for its lateral movement.

14. A pickup arm assembly for a sound pickup means, said pickup arm assembly being supported for lateral and up and down movement, for playing disk records on a rotary turntable means, wherein said pickup arm assembly includes a rotational means for providing vertical movement of the pickup arm assembly said rotational means including: a pickup arm; a vertical support means through which said pickup arm passes; two ball bearing means the outer races of which are supported by said vertical support means; threaded pivot means affixed to extend from both sides of said pickup arm and at right angles thereto, which pivot means extensions respectively pass through the inner race of each of said two ball bearing means; two cone means which are internally threaded along their axes, said cone means being respectively rotated along the threads of the pivot means extensions which extend from the pickup arm, until their outer circumferential cone surface by engagement with the inside circumference of the inner bearing race of said ball bearing means thereby securely hold the pickup arm relative to said vertical support means so that the pickup arm is freely pivoted without excess play, for up and down movement with respect to said vertical support means; whereby, excess play between the balls and the races of the ball bearing means is obviated in said rotational means for vertical movement of the pickup arm.

15. A pickup arm assembly for a sound pickup means, said pickup arm assembly being supported for lateral and up and down movement, for playing disk records on a rotary turntable means, wherein said pickup arm assembly includes: a sound pickup support means having a pickup arm; said sound pickup support means being disposed, with respect to the pickup arm, for supporting a sound pickup means with the stylus of the sound pickup means being located at one of the distal ends of the pickup arm; a pivot means for supporting said pickup arm for up and down movement, said pivot means being located between both distal ends of said pickup arm; a counterweight means which is at all times positioned on said pickup arm on the opposite side of said pivot means from that side on which the stylus of the sound pickup means is located, said counterweight means being capable of being affixed to said pickup arm in preselected positions relative to said pickup arm and to said pivot means; said counterweight means including a counterweight and a mass means, said mass means being capable of being positioned on said counterweight, in preselected positions relative to said counterweight in a longitudinal direction, said mass means being smaller in weight than said counterweight and being movable for fine adjustment on said counterweight while said counterweight remains stationary; whereby, after approximately adjusting the downward stylus tracking force by the counterweight means, various adjustments for very fine small values of downward stylus tracking force can be easily and quickly obtained by positioning said mass means longitudinally on said counterweight.

16. The pickup arm assembly set forth in claim 15, wherein said counterweight has divisions marked thereon that are spaced apart along its outer surface in a longitudinal direction, which divisions are calibrated in values of downward stylus force; whereby, relatively small changes in value of downward stylus tracking force can be preselected by positioning the mass means, with respect to the divisions on the counterweight, without the use of an external independent weighing scale—or, after, balancing the pickup arm, sound pickup support means, and sound pickup means about said pivot means for up and down movement of the pickup arm, by means of said counterweight means with said mass means being stationarily positioned on said counterweight, by, then, positioning said mass means, relative to the divisions on the counterweight, toward said pivot means, relatively small values of downward stylus tracking force can be preselected and obtained, without the use of an external independent weighing scale—and the value of downward stylus tracking force that has been preselected can, at all times, be seen, at a glance, in a pickup arm assembly requiring no springs.

17. A pickup arm assembly for a sound pickup means, said pickup arm assembly being supported for lateral up and down movement, for playing disk records on a rotary turntable means, wherein said pickup arm assembly includes: a sound pickup support means having a pickup arm; said sound pickup support means being disposed, with respect to the pickup arm, for supporting a sound pickup means with the stylus of the sound pickup means being located at one of the distal ends of the pickup arm; a first pivot means for supporting said pickup arm for up and down movement, said first pivot means being located between both distal ends of said pickup arm; a counterweight means which is at all times positioned on said pickup arm on the opposite side of said first pivot means from that side on which the stylus of the sound pickup means is located, said counterweight means being capable of being affixed to said pickup arm in preselected positions relative to said pickup arm and to said first pivot means to provide a preselected, downward, stylus tracking force when said sound pickup support means is equipped with a sound pickup means; said pickup arm being a rod, the rod being formed from a rod which is straight lengthwise vertically, to a rod which is bent vertically upwardly providing a section which is disposed in a horizontal plane above the plane of the remainder of said rod, so that the forming causes the center-line of the total mass of said combination of the pickup arm with said counterweight means, said sound pickup support means, and a preselected sound pickup means (which total mass is pivoted about its said first pivot means for its up and down movement) to shift to a new position which new position of the center-line of said total mass is in the limits from a position of where it passes closer to (to and including a position of where it actually passes through) the axis of rotation of said first pivot means for up and down movement; whereby, to eliminate appreciable variations in any preselected value of, downward, force of the stylus, when it is measured at various elevations above the top surface of the rotary turntable means.

18. The pickup arm assembly set forth in claim 17, wherein said pickup arm is a tubular rod on the side of the first pivot means on which the stylus of the sound pickup means is located.

19. The pickup arm assembly set forth in claim 17, wherein said pickup arm is a round tubular rod on the side of the first pivot means on which the stylus of the sound pickup means is located.

20. The pickup arm assembly set forth in claim 17, wherein said counterweight means includes a counterweight and a mass means, said mass means being capable of being positioned on said counterweight, in preselected positions relative to said counterweight in a longitudinal direction, wherein said counterweght is in the form of a sleeve and said mass means is in the form of a sleeve, said mass means being in concentric relation to said counterweight, and said mass means being smaller in weight than said counterweight and being movable for fine adjustment on said counterweight while said counterweight remains stationary; whereby, after approximately adjusting the downward stylus tracking force by the counterweight means, various adjustments for very fine small values of downward stylus tracking force can be easily and quickly obtained by positioning said mass means longitudinally on said counterweight while maintaining the feature of claim 17.

21. The pickup arm assembly set forth in claim 20, wherein said counterweight has divisions marked thereon that are spaced apart along its outer surface in a longitudinal direction, which divisions are calibrated in values of downward stylus force; whereby, by positioning the mass means longitudinally in various positions on the counterweight, various relatively small values of downward stylus tracking force can be preselected and obtained.

22. The pickup arm assembly set forth in claim 17, wherein the pickup arm assembly further includes: a support means for supporting said first pivot means; a second pivot means for supporting said support means for rotational movement and for thereby permitting lateral movement of the pickup arm; a mass means attached to said support means; said mass means including means on which it is adjustable with respect to said support means to vary its spacing therefrom; said pickup arm, said counterweight means, said sound pickup support means, and a preselected sound pickup means being sufficiently in balance, with respect to their said second pivot means for their lateral movement, that said mass means is positioned on said means on which it is adjustable with respect to said vertical support means to serve, solely, to balance the imbalance, of the pickup arm means with respect to its said second pivot means for its lateral movement, that is caused by said adjustment of the counterweight means with respect to said first pivot means in providing said preselected downward stylus tracking force.

23. The pickup arm assembly set forth in claim 22 wherein said mass means is in substantially the same vertical plane as the counterweight means.

24. The pickup arm assembly set forth in claim 23, wherein said means on which said mass means is adjustable have divisions on its outer surface spaced apart in a longitudinal direction, which divisions are calibrated to correspond to values of downward stylus tracking force so that the mass means, for any value of downward stylus tracking force that is preselected, by being positioned at the corresponding division in said means on which the mass means is adjustable, balances the pickup arm assembly relative to said second pivot means for its lateral movement.

25. A pickup arm assembly for a sound pickup means, said pickup arm assembly being supported for lateral and up and down movement, for playing disk records on a rotary turntable means, wherein said pickup arm assembly includes: a sound pickup support means having a pickup arm; said sound pickup support means being disposed, with respect to the pickup arm, for supporting a sound pickup means with the stylus of the sound pickup means being located at one of the distal ends of the pickup arm; a first pivot means for supporting said pickup arm for up and down movement, said first pivot means being located between both distal ends of said pickup arm; a counterweight means which is at all times positioned on said pickup arm on the opposite side of said first pivot means from that side on which the stylus of the sound pickup means is located, said counterweight means being capable of being positioned on said pickup arm in preselected positions relative to said pickup arm and to said first pivot means to provide a preselected, downward, stylus tracking force when said sound pickup support means is equipped with a preselected sound pickup means; a vertical support means for supporting said first pivot means; a second pivot means for supporting said vertical support means for rotational movement and for thereby permitting lateral movement of the pickup arm; a mass means which includes a mass and a supporting member therefor, said supporting member being fixed to and extending from said vertical support means, said mass being carried on said supporting member and being capable of being positioned thereon with respect to the vertical support means to vary the spacing of said mass with respect to said vertical support means, to balance the imbalance, of the pickup arm assembly with respect to its second pivot means for its lateral movement, that is caused by said positioning of the counterweight means with respect to said first pivot means in providing said preselected downward stylus tracking force.

26. The pickup arm assembly set forth in claim 25, wherein said supporting member has divisions on its outer surface spaced apart in a longitudinal direction, which divisions are calibrated tto correspond to values of downward stylus tracking force so that said mass, for any value of downward stylus tracking force that is preselected, by being positioned at the corresponding division on said supporting member, balances the pickup arm assembly relative to said second pivot means for its lateral movement.

27. The pickup arm assembly set forth in claim 26, wherein said mass means is substantially in the same vertical plane as the counterweight means.

28. The pickup arm assembly set forth in claim 27, wherein said pickup arm, said counterweight means, said sound pickup support means, and a preselected sound pickup means is sufficiently in balance, with respect to their said second pivot means for their lateral movement, that said mass is positioned on said supporting member with respect to said vertical support means to serve, solely, to balance the imbalance, of the pickup arm assembly with respect to its said second pivot means for its lateral movement, that is caused by said adjustment of the counterweight means with respect to said first pivot means in providing said preselected downward stylus tracking force.

References Cited by the Examiner

UNITED STATES PATENTS

| | | | |
|---|---|---|---|
| 2,660,437 | 11/1953 | Harmon | 274—23 X |
| 2,983,517 | 5/1961 | Klein | 274—23.1 |
| 3,028,161 | 4/1962 | Siebert | 274—23 |
| 3,051,494 | 8/1962 | Walton | 274—23 |

NORTON ANSHER, *Primary Examiner.*

C. B. PRICE, *Assistant Examiner.*